S. FREY.
HOLDER FOR CONTAINERS.
APPLICATION FILED MAY 7, 1919.
1,337,010.
Patented Apr. 13, 1920.
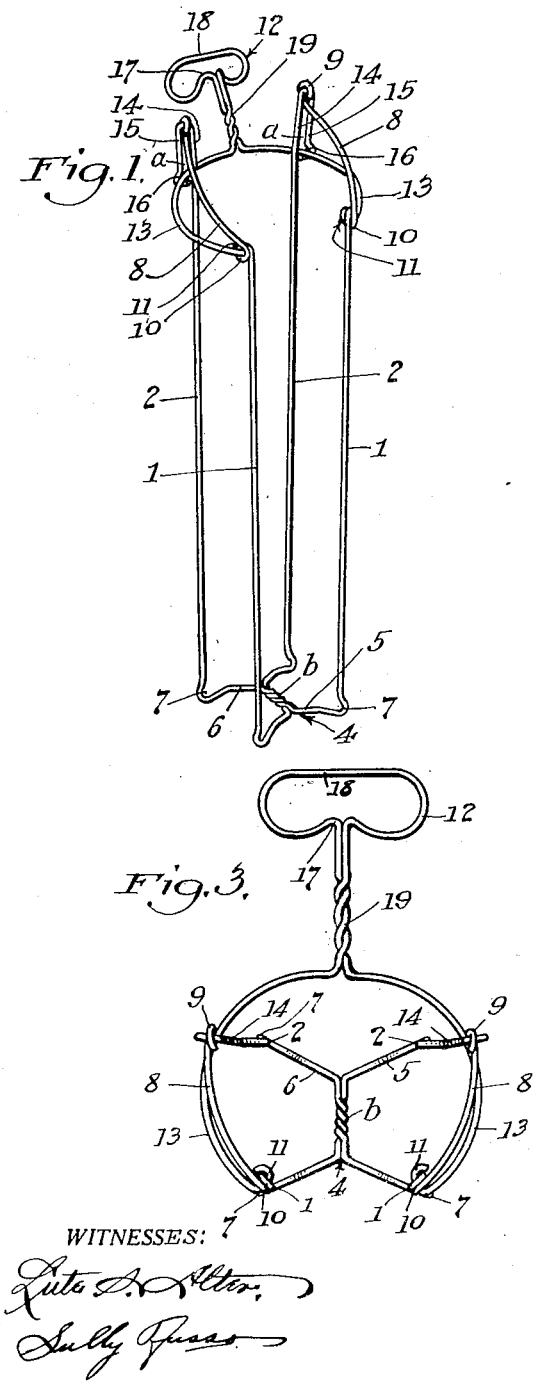
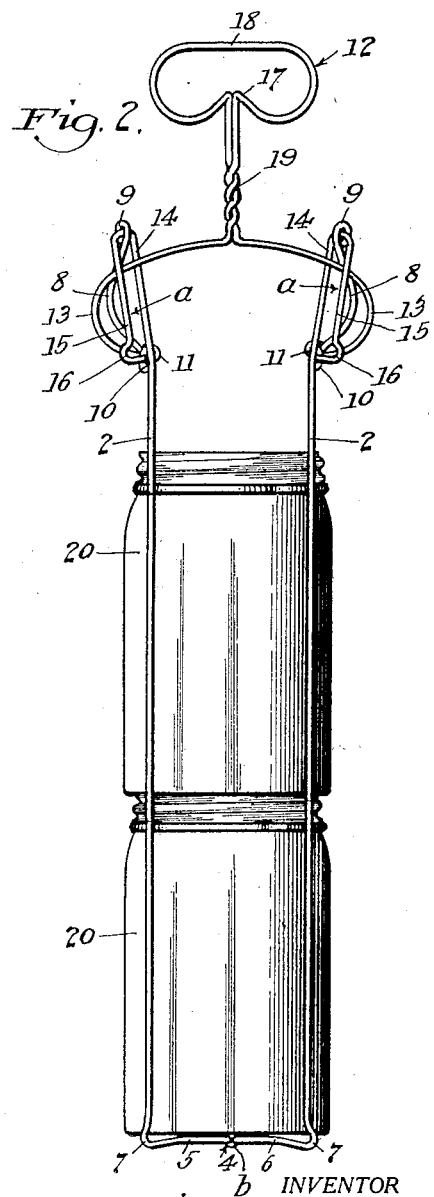
WITNESSES:
INVENTOR
Sigmund Frey
BY
ATTORNEY

UNITED STATES PATENT OFFICE.

SIGMUND FREY, OF LOS ANGELES, CALIFORNIA, ASSIGNOR TO WOOLWINE METAL PRODUCTS COMPANY, OF LOS ANGELES, CALIFORNIA, A CORPORATION OF CALIFORNIA.

HOLDER FOR CONTAINERS.

1,337,010.   Specification of Letters Patent.   Patented Apr. 13, 1920.

Application filed May 7, 1919. Serial No. 295,423.

*To all whom it may concern:*

Be it known that I, SIGMUND FREY, a citizen of the United States, residing at Los Angeles, in the county of Los Angeles and State of California, have invented a new and useful Holder for Containers, of which the following is a specification.

This invention relates to means whereby containers are held so that they can be readily inserted in and removed from a vessel for processing the food in the containers, and an object of the invention is to provide a holder of this character in which it is convenient to insert the containers and from which said containers can readily be removed.

Another object is to make provision for contracting and expanding the upper end of the holder so as to make it possible to positively clamp food containers in the holder and release them from the holder.

Another object is to so construct the holder that when the holder is suspended by the handle said handle will function to contract the upper end of the container so as to securely hold the containers against accidental displacement in or from the holder.

Other objects and advantags will appear in the subjoined detailed description.

The accompanying drawings illustrate the invention:

Figure 1 is a perspective view of a holder constructed in accordance with the provisions of this invention, the handle being in holder-expanding position.

Fig. 2 is a rear view of the holder shown in Fig. 1, the handle being in holder-contracting position.

Fig. 3 is a plan view of the holder with the handle in the same position as in Fig. 1.

The holder comprises a pair of front standards 1 and a pair of rear standards 2, said standards all being joined to a base 4. In the instance shown in the drawings the base 4 is formed of two separate members 5, 6, the member 5 being integral with one each of the standards 1, 2, and the base member 6 being integral with the other standards 1, 2. The standards may be formed of wire, or the like, and the members 5, 6, as shown, may be twisted at *b* or otherwise hinged together so as to pivotally connect the standards to one another. At the juncture of the standards 1, 2 with the base 4 there are provided outwardly and downwardly bent portions 7, forming notches at the junction of the standards with the base.

The standards 1 at their upper ends are bent toward the standards 2 as indicated at 8 and the bent portions 8 terminate in eyes 9 which engage the upper ends of the standards 2. The standards 1 are provided with intermediate eyes 10 which pivotally receive the ends 11 of a handle 12. The handle 12 comprises a cam-engaging member 13 which may be in the form of a fork of more or less circular form. The member 13 is adapted to engage the outer sides of upwardly and outwardly bent cam members 14 forming in part the upper ends of the standards 2, and said member 13 is also adapted to engage the inner sides of upwardly and outwardly bent cam members 15 which also form in part the upper end portions of the standards 2. The members 14, 15 are spaced apart sufficiently to allow the member 13 to pass between them and the spaces *a* thus formed constitute cam slots.

From the foregoing it is clear that, when the handle is pulled upwardly, the member 13 bears against the outer faces of the members 14 so as to push the upper ends of the standards 2 toward one another and thus contract the holder. It is clear that when the handle is pushed downwardly from the position shown in Fig. 2 it will bear against the inner sides of the members 15 so as to push the standards 2 outwardly, and thus expand the holder. The portions 8 of the standards 1 are sufficiently rigid to cause the standards 1 to also move in and out with the standards 2. It may be desirable to provide latch means to hold the member 13 in its holder-expanding position and for this purpose the lower ends of the members 15 may be bent outwardly and then inwardly to form notches or seats 16 to receive the member 13 when said member is substantially in horizontal position.

The handle 12 is provided with means whereby the holder may be suspended from the rim of a suitable cooking vessel, not shown, and said means in the present instance are in the form of a hook-shaped portion 17 of the handle 12, said hook being between the grip 18 of the handle and a stem 19 which connects the grip portion 18 with the member 13.

The invention operates as follows: When it is desired to sterilize or cook the food in containers such, for instance, as those indicated at 20 in Fig. 2, said containers, after being filled with the food to be sterilized or cooked, will be inserted in the upper end of the holder when said holder is resting on a support and is in the expanded condition shown in Figs. 1 and 3 of the drawings. If the containers 20 are not too tall two of them may be placed in the holder in superposed position. The person using the holder will then grasp the holder by the grip portion 18 and pull upwardly on the handle to release the member 13 from the notches 16 and to cause the member 13 to bear against the outer sides of the members 14 so as to force the standards 2 toward one another into resilient engagement with the containers 20. When the standards 2 are thus moved they serve to also move the standards 1 toward one another into resilient engagement with the containers 20. Then the holder with the containers 20 therein will be inserted in a suitable cooking vessel, not shown, containing water or other liquid designed to be heated and to heat the containers; and the hook-shaped portion 17 will be hooked over the upper edge or rim of the cooking vessel. The cooking vessel will be of sufficient depth so that, when the holder is thus suspended from the rim of the cooking vessel, the base of the holder will be free from the bottom of the cooking vessel. Thus the weight of the containers 20 and the food stuffs therein functions to hold the standards 1 and 2 close against the containers 20 so that said containers cannot shift to and fro in the holder. It is understood that any suitable number of the holders may be employed in one cooking vessel, for example the cooking vessel may be of sufficient diameter to accommodate six or more of the holders arranged in a circle or otherwise around the inside of the cooking vessel.

When the contents of the containers have been sterilized or cooked sufficiently long, the person attending to the cooking will grasp the grip portion 18 of the handle and lift the holder and its contents from the cooking vessel. It is noted that, in lifting the holder from the cooking vessel, the weight of the containers 20 will continue to function to hold the standards 1 and 2 toward one another, since the member 13 bears against the outer sides of the upwardly and outwardly slanting members 14. The holder will then be rested upon a suitable support and the handle 12 will be forced downwardly so as to cause the member 13 to bear against the inner sides of the members 15 to thereby force the upper ends of the standards 1, 2 at one side away from the upper ends of the standards 1, 2 at the opposite side, thus expanding the holder. The containers 20 will then be lifted from the holder.

It is noted that, at the time of removing the containers 20 from the holder, said containers are of comparatively high temperature and that because of the expansible character and expanded condition of the holder the containers will not be held by pressure of the standards 1, 2 against them as is the case with other holders of this general type of prior construction. The standards 1, 2 and base 4 together form an expansible and contractible receptacle. It is also to be noted that, when the containers are in place in the holder and the holder is being handled by the operator, there is no danger of the containers falling out of the holder because of the clamping action produced by the members 13, 14. When the holder is supported by the handle the pressure of the standards 1 and 2 against the containers, especially against the uppermost container, is sufficient to prevent endwise shifting of the containers but, owing to the resiliency of the standards 1, 2, said standards will yield sufficiently, when pressed against the containers, to accommodate themselves more or less to irregularities in the peripheral walls of the containers so that there will be no liability of the pressure of the standards against the containers breaking said containers.

It is to be noted that, because of the provision of the outwardly and downwardly bent portions 7, the engagement of the standards 1, 2 with the containers will be distributed over almost the entire length of the containers and yet sufficient expansion of the holder can take place when the member 13 is in the notches 16 to permit of the lower container being readily inserted in and removed from the holder without binding, since the standards 2 will swing outwardly throughout their entire length. Such movement will be appreciable even at points on said standards adjacent the lower end of the lowermost container.

As clearly shown in the drawings, the holder may be made of wire and the wire may be of the ordinary galvanized iron type. In this instance the holder is made of but three pieces of wire. One each of the standards 1, 2 together with the base member 5 constitute one piece; the other standards 1, 2 and the base member 6 constitute a second piece; and the handle 12 constitutes a third piece. The holder may be formed by hand or by suitable dies in a manner well understood in the art pertaining to the bending of wire.

The invention is not limited in its broader phases to the details of construction shown in the drawings and described above, but includes such changes and modifications as lie within the spirit and scope of the appended claims.

I claim:

1. A holder of the character described comprising a base, standards rising from the base and forming cam faces at their upper ends, other standards rising from the base and connected at their upper ends with the first standards, and a member pivoted to the last standards and engaging the cam faces to cause movement of the standards.

2. A holder of the character described comprising a base, standards rising from the base and having upwardly and outwardly extending members, other standards rising from the base and connected with the first standards, and a member pivoted to the last standards and adapted to bear against the outer sides of the upwardly and outwardly extending members.

3. A holder of the character described comprising a base, standards rising from the base and having upwardly and outwardly slanting slots at their upper ends, other standards rising from the base and connected with the first standards, and a member pivoted to the last standards and passing through the slots.

4. A holder of the character described comprising a base, standards rising from the base and provided with upwardly and outwardly slanting slots, other standards rising from the base and bent at their upper ends toward the first standards and attached thereto, and a handle having a fork pivoted at its ends to the second named standards and passing through the slots.

5. A holder of the character described comprising a base, standards rising from the base and provided with upwardly and outwardly slanting slots, other standards rising from the base and bent at their upper ends toward the first standards and attached thereto, and a handle having a fork pivoted at its ends to the second named standards and passing through the slots, said handle having a hook-shaped portion adapted to engage the rim of a vessel.

6. A holder of the character described comprising a base, standards rising from the base and provided with upwardly and outwardly slanting slots, other standards rising from the base and bent at their upper ends toward the first standards and attached thereto, and a handle having a fork pivoted at its ends to the second named standards and passing through the slots, there being notches in the standards adjacent the lower ends of the slots adapted to engage and hold the fork.

Signed at Los Angeles, California, this 30th day of April, 1919.

SIGMUND FREY.

Witnesses:
GEORGE H. HILES,
L. BELLE WEAVER.